(12) United States Patent
Dotan et al.

(10) Patent No.: US 10,038,697 B2
(45) Date of Patent: Jul. 31, 2018

(54) DETERMINING SIMILARITY BETWEEN SECURITY RULES BASED ON WEIGHTED COMPARISONS OF THEIR RULE PARAMETERS

(71) Applicant: Cisco Technology, Inc., San Jose, CA (US)

(72) Inventors: Yedidya Dotan, Newton, MA (US); Christopher Duane, Groton, MA (US); Daniel Hollingshead, Somerville, MA (US); Denis Knjazihhin, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 14/807,120

(22) Filed: Jul. 23, 2015

(65) Prior Publication Data

US 2016/0344738 A1 Nov. 24, 2016

Related U.S. Application Data

(60) Provisional application No. 62/163,521, filed on May 19, 2015.

(51) Int. Cl.
*H04L 29/06* (2006.01)

(52) U.S. Cl.
CPC ............ *H04L 63/101* (2013.01); *H04L 63/20* (2013.01)

(58) Field of Classification Search
CPC .............................. H04L 63/20; H04L 63/101

USPC ............................................................ 726/1
See application file for complete search history.

(56) References Cited

U.S. PATENT DOCUMENTS

| | | | |
|---|---|---|---|
| 7,882,537 B2 | 2/2011 | Okajo et al. | |
| 8,042,167 B2 | 10/2011 | Fulp et al. | |
| 8,607,300 B2 | 12/2013 | Wang | |
| 2010/0199346 A1 | 8/2010 | Ling et al. | |
| 2014/0082168 A1 | 3/2014 | Basso et al. | |
| 2016/0212166 A1* | 7/2016 | Henry | H04L 63/20 |
| 2016/0212167 A1* | 7/2016 | Dotan | H04L 63/20 |
| 2016/0212168 A1* | 7/2016 | Dotan | H04L 63/20 |
| 2016/0212169 A1* | 7/2016 | Knjazihhin | H04L 63/20 |
| 2016/0212170 A1* | 7/2016 | Martherus | H04L 63/10 |

* cited by examiner

*Primary Examiner* — Kambiz Zand
*Assistant Examiner* — Aubrey Wyszynski
(74) *Attorney, Agent, or Firm* — Edell, Shapiro & Finnan, LLC

(57) ABSTRACT

First and second security rules are accessed in a configuration file. Comparison points for comparing the first and second security rules are determined. Each comparison point identifies respective rule parameters of the first and second security rules. Respective weights are assigned to the comparison points. For each comparison point, the respective rule parameters are compared against each other to produce a corresponding comparison score indicative of a level similarity. Each comparison score is weighted by the weight assigned to the comparison point corresponding to the comparison score. The weighted comparison scores are combined into a total score indicative of an overall level of similarity between the first and second security rules.

17 Claims, 12 Drawing Sheets

DETERMINING SIMILARITY BETWEEN SECURITY RULES BASED ON WEIGHTED COMPARISONS OF THEIR RULE PARAMETERS

PRIORITY CLAIM

This application claims priority to U.S. Provisional Application No. 62/163,521, filed May 19, 2015, the entirety of which is incorporated herein by reference.

TECHNICAL FIELD

The present disclosure relates to comparing configuration files used to configure network security devices.

BACKGROUND

Network security policies including security rules to control network security devices may be stored in network security policy configuration files. Network security administrators can find it useful to compare such configuration files against each other in search of similarities and differences between the files. Conventional comparisons include inflexible comparisons between configuration parameters in different files, where the configuration parameters are expressed at an "atomic" level, e.g., the parameters are expressed strictly as numerical values. Such low-level comparisons result in low-level comparison results rather than high-level comparison information indicative of user intent that is more useful to the network administrator.

DESCRIPTION OF EXAMPLE EMBODIMENTS

Overview

Figure 1:
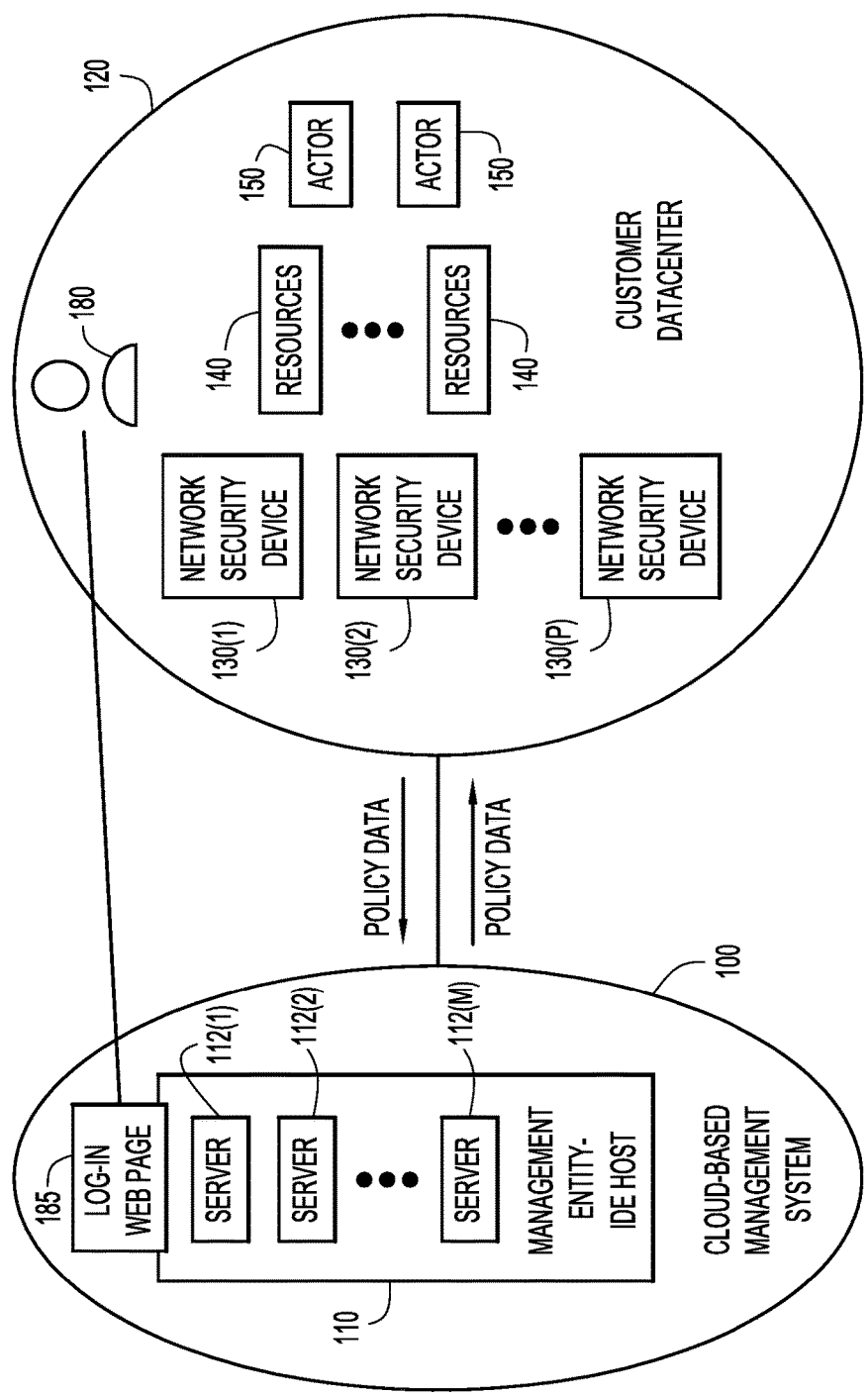
FIG. 1 is a cloud-based management system in which an Integrated Development Environment (IDE) is provided for a network security device configuration file, according to example an embodiment.

In an embodiment, a first security rule and a second security rule from a configuration file stored in a memory are accessed. Each of the first and second security rules includes multiple rule parameters to cause a security appliance to apply an access control when a source attempts to access a destination. Comparison points for comparing the first and the second security rules are determined. Each comparison point identifies respective rule parameters of the first and the second security rules. Respective weights are assigned to the comparison points. For each comparison point, the respective rule parameters are compared against each other to produce a corresponding comparison score indicative of a level of similarity. Each comparison score is weighted by a weight assigned to the comparison point corresponding to the comparison score. The weighted comparison scores are combined into a total score indicative of an overall level of similarity between the first and the second security rules. The first and the second security rules are classified as identical or similar based on the total score.

Example Embodiments

A network security policy configuration file for a network security device/appliance, such as an Adaptive Security Appliance (ASA), Web Security Appliance (WSA), or firewall includes network security rules, such as an access control list (ACL). From a user/human perspective, e.g., the perspective of a network administrator, such an ACL in the configuration file expresses user intent to perform certain security functions, e.g., intent to block all users from Facebook or intent to allow all users to access Facebook through a firewall. A network administrator for a given network may be required to construct, edit, and generally manage many different configuration files for many different corresponding network security devices in the network. A configuration file management tool useful to the network administrator is one that compares different configuration files or ACLs within the files against one another to identify similarities between the files, or ACLs in the files.

One conventional technique compares ACLs in the configuration files against each other only at a detailed or granular level, using compares of numerical values that represent the rule parameters of the security rules in the ACLs. It is unlikely that such low-level comparisons will discover certain similarities of intent, since there may be two rules that look completely different from the low-level ip_address-port-protocol perspective but serve a very similar intent for the user. The user indicates this intent through the custom strings they chose to describe those low-level attributes. Thus, a problem with such low-level or "strict" comparisons is that the comparisons do not yield meaningful information regarding differences or similarity in an "intent"

of the compared ACL rules, i.e., the user intent expressed by the ACL rules. In an example, intent is indicated in a security rule by, for example, meaningful names used to represent the objects and object groups. With strict security rule comparison, generally too few security rule similarities are indicated compared to the number of security rule similarities that should have been indicated from the perspective of the intent of the user.

Accordingly, a generalized linear model (GLM) comparison technique is used to ascertain a level of similarity between different configuration files as expressed by their ACL rules to reveal similarity in intent between the security rules. The GLM technique performs comparisons at a higher level than the conventional technique, and also uses security rule comparisons against a dictionary constructed around certain security rule meaning or intent. GLM is a method to take information presented in linear, nominal, and ordinal senses and merge the information into a linear model for a quantitative response. The GLM described herein is a model that, in part, takes lists and a dictionary and translates them to a linear model.

Comparisons of network security rules using the GLM technique may be employed in connection with a cloud-based network security management system described in connection with FIG. 1. With reference to FIG. 1, there is shown a cloud-based management system 100 in which a network security device configuration file Integrated Development Environment (IDE) (referred to simply as an "IDE") may be used. The IDE may invoke comparisons of network security rules using the GLM technique, as described below. Cloud-based management system 100 communicates with network security devices of a customer datacenter 120. FIG. 1 shows the details of one customer datacenter, but it should be understood that the cloud-based management system 100 may connect and communicate with multiple customer datacenters.

The cloud-based management system 100 includes a management entity 110 including one or more computer servers 112(1)-112(M) that execute software to perform the operations associated with an IDE and, in this way, management entity 110 is said to host the IDE. An example of a hardware configuration for management entity 110 is described in more detail below in connection with FIG. 4.

Customer datacenter 120 includes a plurality of network security devices or products (also referred to as network security appliances) 130(1)-130(P). Within a customer datacenter there are one or more resources 140 and one or more actors 150. The resources 140 may include servers, databases, and the actors 150 are users or processes using a computing device (personal computer, SmartPhone, etc.) that may seek access to one or more of the resources 140. The resources and actors may also reside outside the customer datacenter itself, e.g., in the Internet. The network security devices 130(1)-130(P) control access of the actors 150 to the resources 140 according to network security policies, e.g., sets of one or more network security rules configured on the respective network security devices. The IDE hosted in management system 100 may be used to compare, examine, validate, and edit the network security policies (and the security rules therein).

Figure 2:
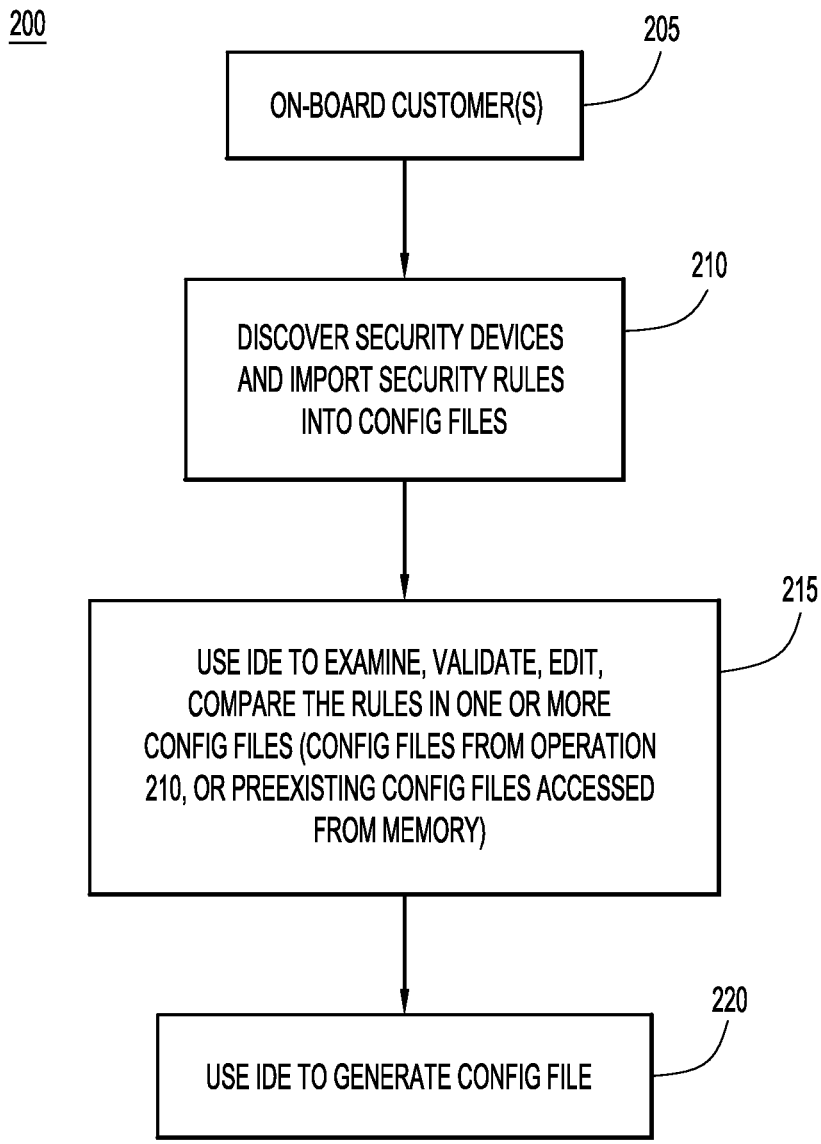
FIG. 2 is a flowchart of a process for the IDE in a network security device, according to an example embodiment.

Turning now to FIG. 2, there is a flowchart of a method 200 of using the IDE in the environment of FIG. 1. FIG. 2 is described with continued reference to FIG. 1. At 205, a customer (e.g., a business or enterprise) is "on-boarded" to cloud-based management system 100. This involves a network administrator/user 180 logging on to a log-on web page 185 served by one of the servers 112(1)-112(M) of the management entity 110. The log-on web page 185 allows network administrator 180 to set up privileges to permit management entity 110 to communicate, over the Internet, with customer datacenter 120 in order to connect to network security devices 130(1)-130(P). In addition, during the initial log-in and setup phase, network administrator 180 provides names and address (e.g., Internet Protocol (IP) addresses) for each of network security devices 130 in customer datacenter 120. Other types of set-up processes may be used other than use of a log-on web page.

At 210, management entity 110 discovers network security devices 130 and may import the policies as policy data from each network security device. Briefly, this involves sending a connection string and device type tag to each network security device 130(i). Each network security device 130(i) responds with device descriptor and policy data for each network security rule configured on the respective network security device. An example subset of the policy data imported form a security device may be:

Protocol: HTTPS
Network: All
Destination: 132.180.0.0/24
Description: Web
Policy: On
Logging: On Management entity 110 stores the discovered data describing the discovered security devices 130 and their native policies. The native policies are stored into respective configuration files (where each configuration file is also referred to as a "config file" or simply a "config"). Each native network security policy may be one or more native network security rules associated with a named network security device and formatted according to a corresponding native policy model for a network security device. Each native network security rule may in turn include a set of security rule parameters to permit or deny network access for the named network security device based on a network protocol, source and destination addresses, and a device port.

At 215, network administrator 180 may invoke the IDE hosted on management entity 110 to display, examine, validate, edit, and/or compare the security rules in one or more of the configuration files created in operation 210 or other preexisting configuration files stored in management entity 110, as described below in connection with FIG. 5.

At 220, administrator/user 180 may also use the IDE to generate and validate new configuration files.

Figure 3:
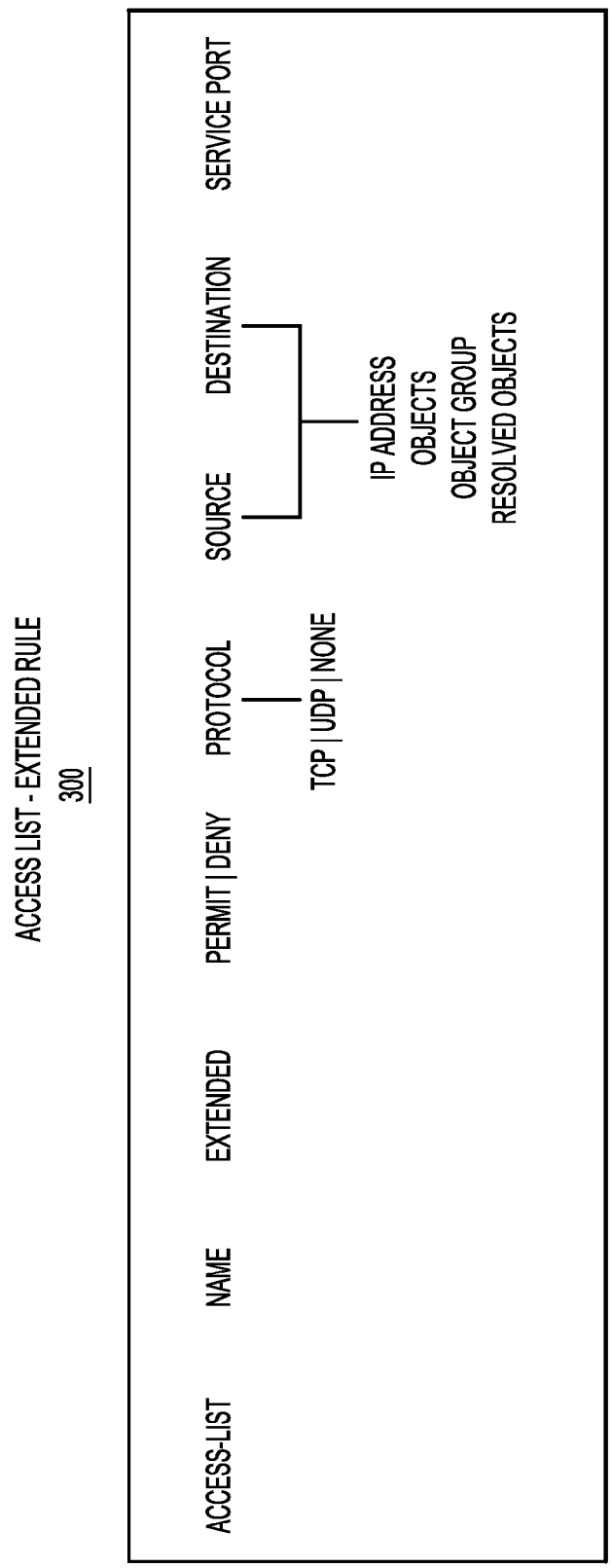
FIG. 3 is an illustration of an example format or syntax for a security rule on which the IDE may operate, according to an example embodiment.

With reference to FIG. 3, there is an illustration of an example format or syntax for an example security rule 300 on which the IDE may operate. Security rule 300 is formatted as an access control list (ACL)—extended rule, in which: "NAME" is an object or object group (i.e., a name of a group of rules); "EXT" is a constant; "PERMIT|DENY" is an access control imposed by the rule; "Protocol" is a communication protocol used for an attempted access and may be expressed as an object or an object group. "S" and "D" may each be a tuple that expresses a service port and address, and may be expressed as either an object or an object group, e.g., "all my inbound email" or "all my outbound email," or called by an object name. S and D may each be identified as a string. In an example, "any" means any port, any address.

Further examples of network security rules that the IDE may operate on include:
1. Access-list left-to-right extended permit ip host 172.16.1.10 host 192.168.1.10.

2. Access-list someName extended permit tcp 172.19.103.0 255.255.255.0 object-group Application-Servers object-group DM_INLINE_TCP_443.
3. Block all users from using facebook messaging.
4. Allow all users to use Linked in but only allow HR to post jobs on Linkedin, allow all users to use Linkedin.

Figure 4:
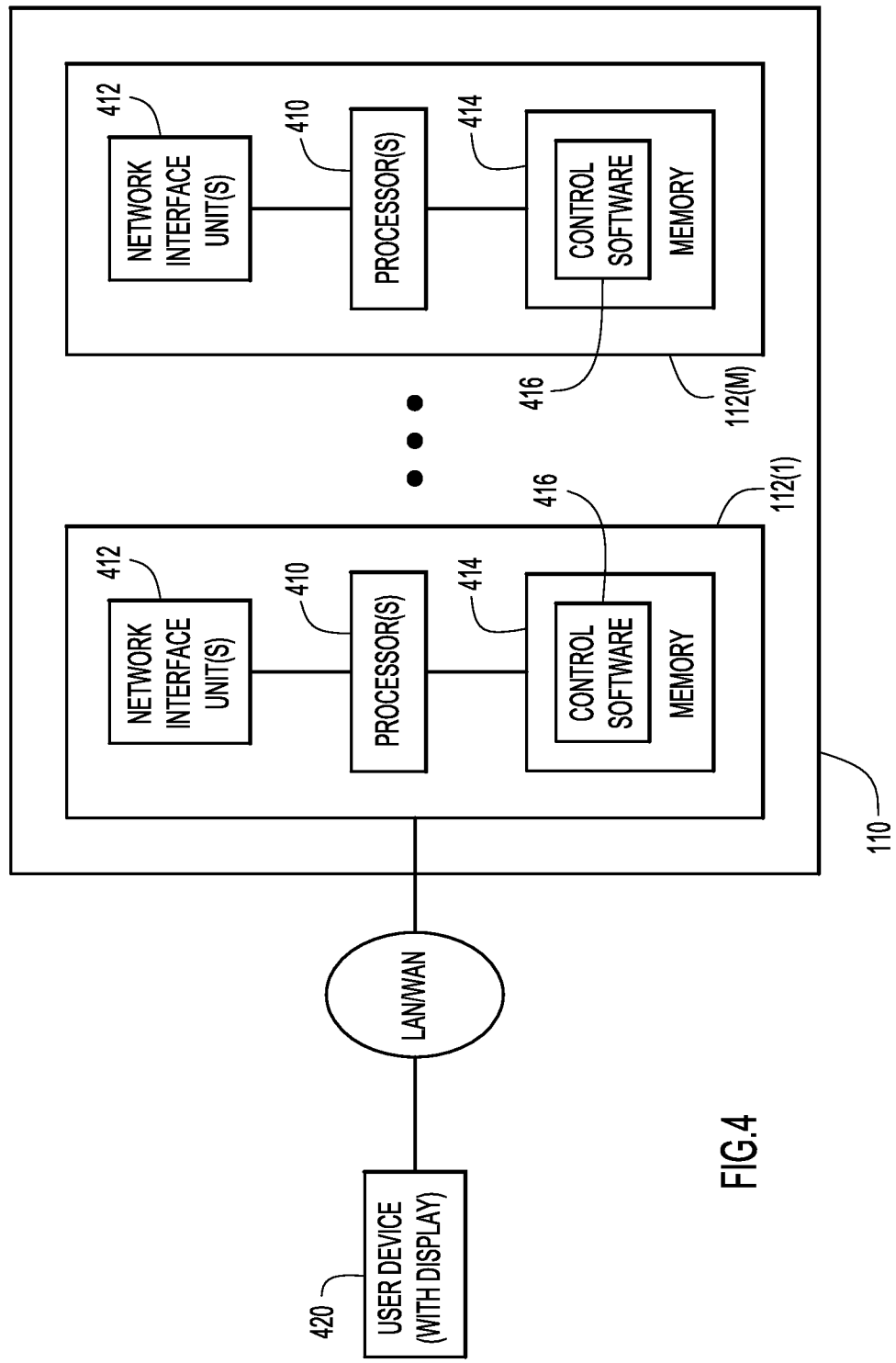
FIG. 4 is a block diagram of an example hardware implementation for a management entity of the cloud-based management system of FIG. 1 that may host the IDE, according to an example embodiment.

Turning now to FIG. 4, a block diagram is shown of an example hardware implementation for the management entity 110. In one example, the management entity 110 includes one or more servers 112(1)-112(M). Each server includes one or more processors 410, one or more network interface units 412 and memory 414. The memory 414 stores control software 416, that when executed by the processor(s) 410, cause the server to perform the various operations described herein for the management entity 110 and the IDE. Local user input/output devices (not shown) may be coupled with management entity 110 to enable a user to enter information and receive information from the management entity. Such devices include, but are not limited to, a display, a keyboard, a mouse, and so on.

The processor(s) 410 may be a microprocessor or microcontroller (or multiple instances of such components). The network interface unit(s) 412 may include one or more network interface cards that enable network connectivity.

The memory 414 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 414 may comprise one or more tangible (non-transitory) computer readable storage media (e.g., memory device(s)) encoded with software or firmware that comprises computer executable instructions. For example, control software 416 includes logic to implement the operations described herein in connection with the IDE, including operations to compare security rules using the GLM technique, a security rule editor associated with the IDE, and a User Interface (UI) (such as a Graphical User Interface (GUI)) associated with the IDE. Memory 414 also stores data (not shown) generated and used by the aforementioned logic. For example, the data may include a mapping database to map object names expressed in security rules to object attributes, and security rule classifications, all of which are described below.

Administrator 180 may interact with management entity 110 through UIs by way of a user device 420 that connects by way of a network (local area network (LAN) and/or wide area network (WAN)) with the management entity 110. The user device 420 may be a personal computer (laptop, desktop), tablet computer, SmartPhone, etc.

Figure 5:
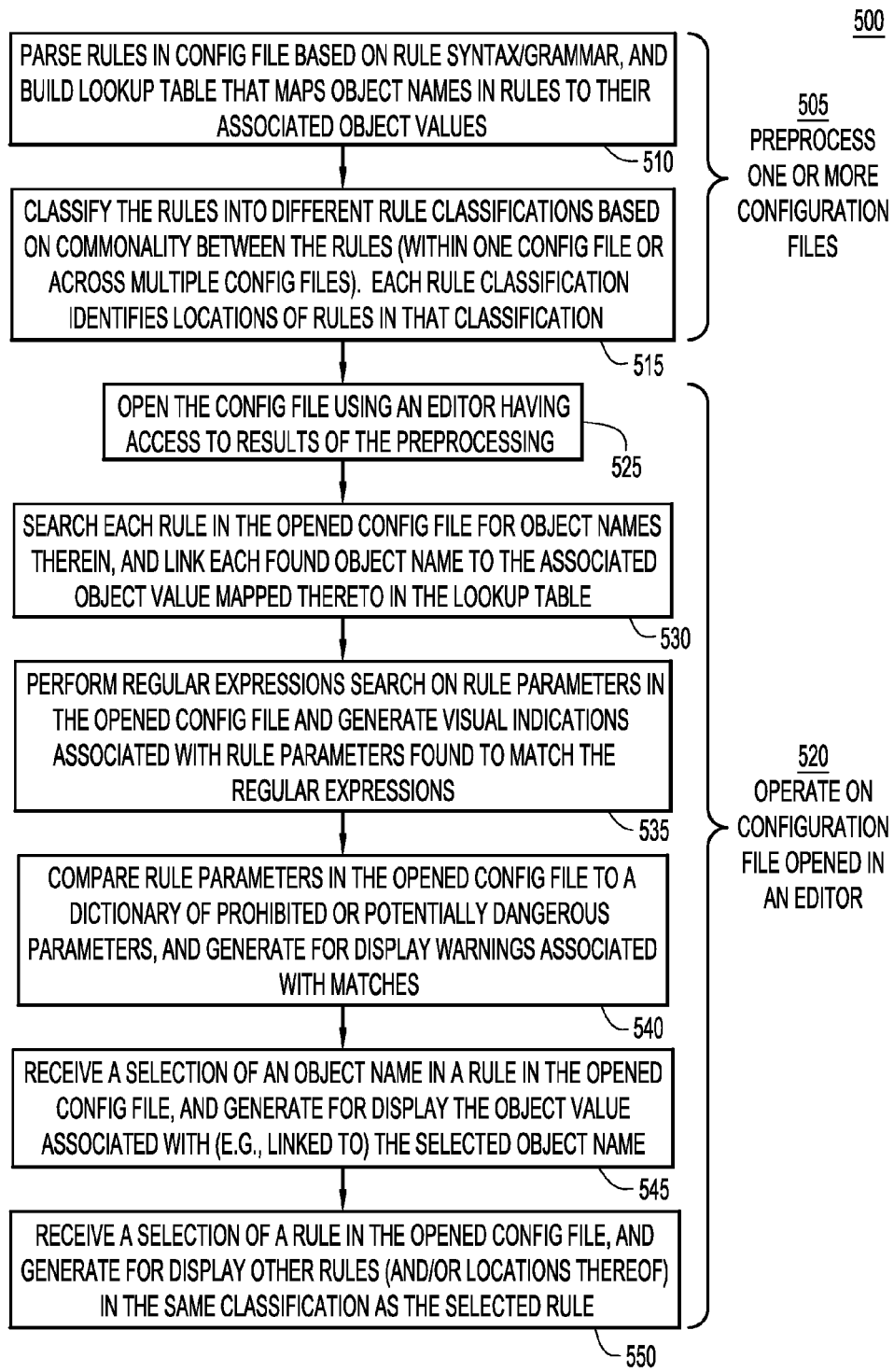
FIG. 5 is a flowchart of an example method of using the IDE to operate on configuration files, according to an example embodiment.

With reference to FIG. 5, there is a flowchart of an example method 500 of using the IDE in cloud-based management system 100 to operate on configuration files, e.g., for network security devices 130. A given configuration file may be a named text file including multiple entries, e.g., sequential lines in the text file, at least some of which correspond to network security rules. Each network security rule includes multiple security rule parameters to cause a network security device to apply a network access control (e.g., permit or deny) when a source (e.g., an IP address or a range of IP addresses) attempts to access a destination (e.g., an IP address or a range of IP addresses). Either the destination or the source (or both) in some of the security rules may be represented as/by a respective object name expressed as an alphanumerical character string associated with an object value defined in an object definition of the configuration file. For generality, the object name may name an object group or simply and object. Also, some of the configuration file entries may represent delineated remarks or comments interspersed among the security rules and that have no effect on the security appliance.

At an initial configuration file preprocessing operation 505, user 180 invokes the IDE to access a configuration file and preprocess the accessed configuration file. Operation 505 creates configuration file preprocessing results accessible to and used by subsequent operations 520 (expanded in further operations 525-550) invoked by a user through a configuration file editor that becomes linked with the preprocessing results. The preprocessing results may be stored, for example, in a companion file associated with or linked to the configuration file. Configuration file preprocessing operation 505 includes preprocessing sub-operations 510 and 515, now described. In an embodiment, operation 500 may access and preprocess multiple configuration files.

At 510, the IDE performs a parser operation, described here at a high-level, to parse the security rules in the configuration file based on a native security rule syntax/grammar to build a mapping database, e.g., a lookup table. The mapping database maps object names in security rules to their associated object values.

At 515, the IDE classifies the security rules in the configuration file into different security rule classifications based on commonality or similarity between the security rules. In another embodiment in which multiple configuration files are accessed for preprocessing, the IDE classifies the security rules across the multiple configuration files based on commonality between the security rules across the multiple configuration files.

In an embodiment, the IDE classifies the security rules, within one configuration file or across multiple configuration files, into one or more identical security rule classifications based on identicality (i.e., a measure of identicality) between the security rules, such that each identical security rule classification includes security rules that are identical to each other. The IDE also classifies the security rules into one or more similar security rule classifications based on similarity (i.e., a measure of similarity) but not identicality between the security rules, such that each similar security rule classification includes security rules that are similar but not identical to each other. The IDE also classifies the security rules into one or more unique security rule classifications for those security rules that are neither classified as identical nor similar to each other. The IDE stores the various security rule classifications in a security rule classification database that also associates each classified security rule with a file location, including (i) a name of the configuration file in which the security rule is found, and (ii) a location, e.g., a line number, where the security rule is found in the configuration file.

Operations 505 and 510 generate preprocessing results including but not limited to (i) the lookup table that maps object names to object values, and (ii) the security rule classifications, which are accessed in subsequent IDE operations 520, as described below. Operations 520 include operations 525-550 performed on a configuration file after it has been preprocessed and opened using an editor, such as a text editor, associated with the IDE.

At 525, responsive to user interaction, the user opens the configuration file in an editor, such as a text editor, through which the user interacts with the security rules in the (opened) configuration file. The user may access the editor through the IDE, i.e., the editor may be provided by the IDE. The editor may add line numbers adjacent each of the security rules and remarks in the opened configuration file and display the line numbers along side the aforementioned entries. Responsive to the configuration file being opened in the editor, the IDE links the opened configuration file with the preprocessing results generated in operation 505. To do this, the IDE may link the opened editor to the preprocessing results using an address pointer or a file pointer directed to the preprocessing results. In this way, the IDE makes the preprocessing results accessible to the editor and, as a result, the user may access the preprocessing results through interaction with the editor.

At 530, the IDE searches each security rule in the configuration file for object names therein. The IDE links or maps each found object name in the security rule to the associated object value mapped thereto in the lookup table of the preprocessing results.

At 535, the IDE performs regular expressions searches on security rule parameters in the opened config file and generates for display visual indications associated with security rule parameters found to match the regular expressions.

The regular expression search may include a search of the security rule parameters of each security rule for an object or object group designator (e.g., the label "object" or the label "object-group") followed by an object name. For each found object or object group designator, the IDE generates for display (e.g., via the editor) a visual object or object group indication to visually differentiate the found object or object group designator from other security rule parameters that are not object or object group designators. As a result, for example, each found object or object group designator may be highlighted in blue when displayed by the editor.

The regular expression search may also include a search for delineated remarks interspersed among the security rules and that have no effect on the security appliance. For each found remark, the IDE may generate for display a visual remark indication to visually differentiate the found remark from the security rules. For example, each found remark may be "greyed-out" when displayed by the editor.

The regular expression search may include a search of the security rule parameters of each security rule for a delimiter, such as "access-list" indicating that a current line in the configuration file is dedicated to a security rule. For each found security rule delimiter, the IDE may generate for display a visual security rule indication to visually differentiate the found security rule delimiter.

Other regular expression searches may be performed and their results indicated visually through the editor.

At 540, the IDE compares security rule parameters in the configuration file to a dictionary that defines prohibited or potentially dangerous parameters and corresponding warnings, and generates for display the warnings associated with any found matches. The dictionary may be generated by the administrator before operations 520 are invoked.

At 545, the IDE receives a user selection of an object name in a security rule in the configuration file via the editor. For example, the user may hover a cursor over the object name or use a mouse to click on the object name, which results in the selection of that object name. In response to the selection, the IDE accesses the object value associated with the selected object name that was linked to the object name at previous operation 530. The IDE generates for display (via the editor) the object value linked to the selected object name. If the IDE is unable to access an object value for the selected object name (because there is no object definition for that object name in the configuration file) the IDE generates for display an error message indicating that the selected object name is not defined. Also, if the IDE determines from the mapping database that the selected object name resolves to two different values, the IDE generates for display an error messages indicating an error associated with the selected object name. The aforementioned errors may also be identified and flagged to the user visually during the parser operation 510.

At 550, the IDE receive a user selection of a security rule in the configuration file through the editor, e.g., when the user selects one of the line numbers displayed adjacent a security rule by the editor. In response, the IDE searches for an entry, corresponding to the selected security rule, in any of the security rule classifications that were generated at previous operation 540. If an entry is found in one of the security rule classifications, the IDE generates for display all of the other rules in the one of the classifications along with the file locations of the other rules (e.g., line numbers and filenames for the other rules).

Figure 6:
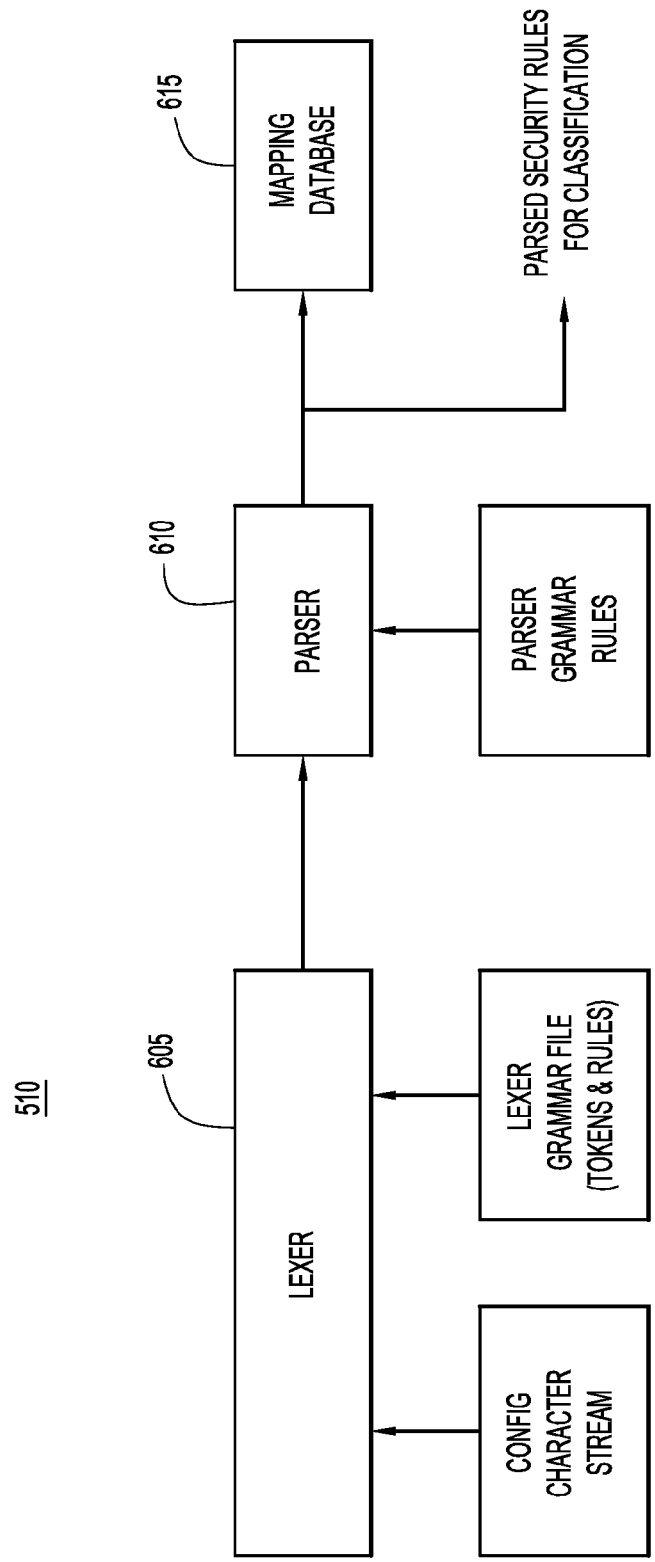
FIG. 6 is a flowchart of a generalized parser operation used of the method FIG. 5, according to an example embodiment.

With reference to FIG. 6, there is a flowchart expanding on high-level parser operation 510 of method 500, according to an embodiment.

A lexer operation 605 (also referred to as "lexer" 605) receives the configuration file, including the security rule parameters of the security rules, the object definitions, and the remarks, in the form of a character stream. Lexer 605 also receives a predetermined lexer grammar file for the security rules including acceptable security rule tokens and grammar rules for the tokens. Lexer 605 tokenizes the security rule parameters of each security rule based on the lexer grammar file to produce a stream of tokens, and delivers the stream of tokens to parser operation 610 (also referred to as "parser 610").

In addition to the stream of tokens, parser 610 receives predetermined parser grammar rules for the security rules. Parser 610 parses the stream of tokens, including object definitions and object names therein, based on the parser grammar rules to build a hierarchical parser tree from the tokens in the stream of tokens. Each time parser 610 encounters an object name while building the parser tree, the parser creates an entry for the object name in the mapping database (indicated at 615 in FIG. 6) that maps the object name to its attributes. Parser 610 searches the object definition tokens for the attributes defined for each object name. The attributes include (i) one or more values associated with the object name as defined in a corresponding configuration file object definition, and (ii) a location in the configuration file, e.g., a line number, of the security rule in which the object name is found. Mapping database 615 may be implemented as a lookup table that uses a hash map to map each object name to its corresponding attributes. Parser 610 also delivers each parsed security rule to security rule classification operation 515, described in detail below.

At operation 515 described above, the IDE classifies security rules into security rule classifications. To do this, the IDE compares each security rule to every other security rule in the configuration file or to every other security rule across multiple configuration files to determine how similar the security rule is to the other security rules based on one or more commonality/similarity criteria. Based on results of the compare, the IDE classifies the security rule into one or more security rule classifications, such as identical classifications, similar classifications, or unique classifications. As mentioned above, each security rule typically includes security rule parameters, such as a name of a group of rules (e.g. "inside-in" vs. "inside-out"), an access control (e.g., permit or deny), a protocol (e.g., IP, TCP, UDP, ICMP), a source (e.g., one or more source IP addresses or a destination IP address range), a destination (e.g., one or more source IP addresses or a destination IP address range), device/service ports, interfaces, and/or context (e.g. a deny rule surrounded by other deny rules), where some of the security rule parameters may be expressed as an object name or object group name associated with attributes, such as numerical values. Such security rule parameters represent points of comparison (also referred to as "comparison points") used to compare and thus classify the security rules. For example, points of comparison used to compare two security rules R1 and R2 may include respective/corresponding security parameters from the rules R1 and R2 that are compared against each other, including:

1. Name of security rule group (e.g. "insidein" vs "inside-out").
2. Control action, e.g., permit/deny.
3. Protocol (e.g., IP, TCP, UDP, ICMP, Protocolgroup identifier).
4. Source vs. Source.
5. Destination vs. Destination.
6. Source vs. Destination (one rule's source vs. another rule's destination).
7. Service ports.
8. Interfaces to which the rule applies.
9. Leading comment.
10. Rule context (e.g. a deny rule surrounded by other deny rules).
11. Configuration context (e.g. the rule appears on a branch configuration).

Figure 7A:
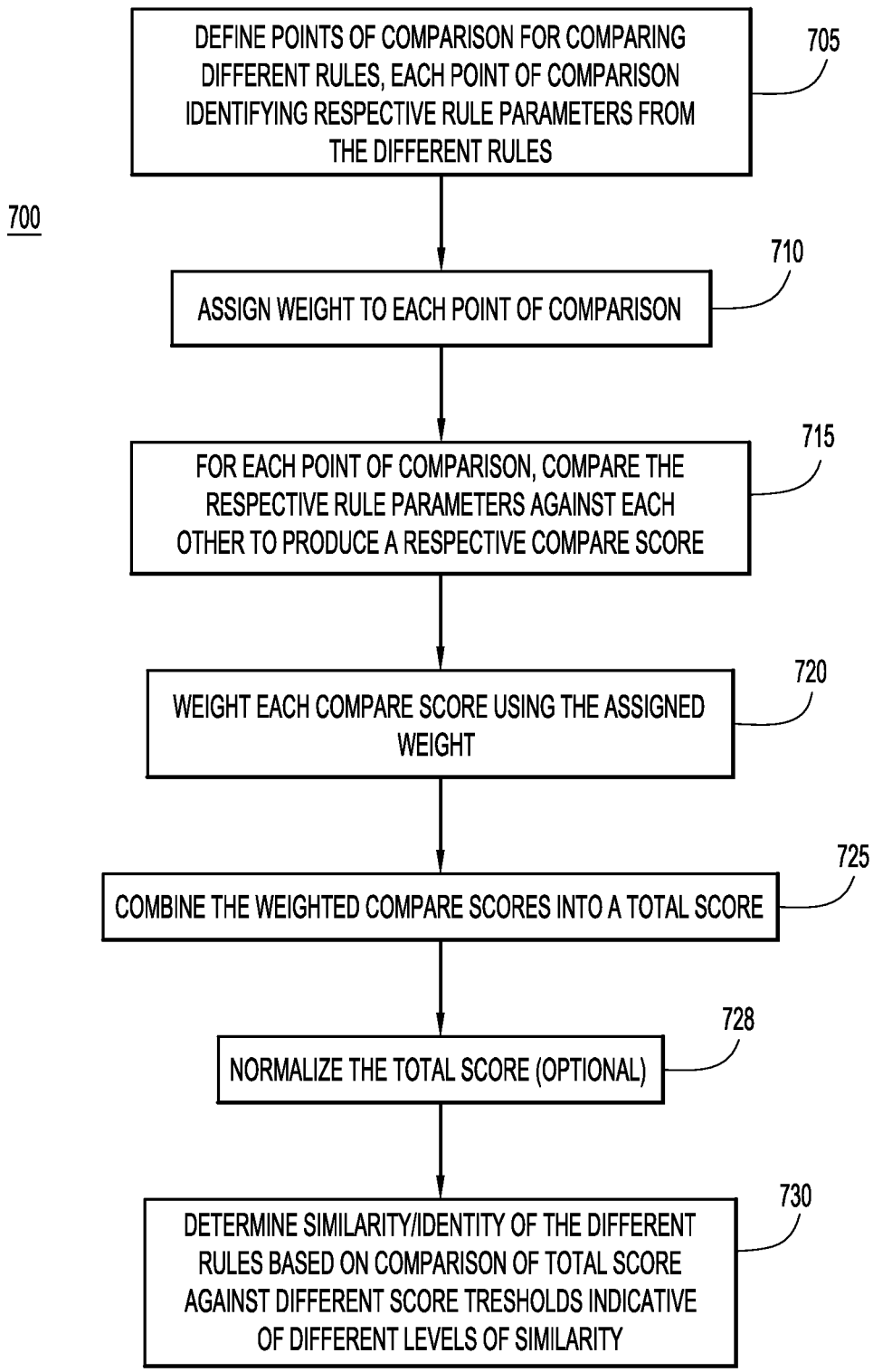
FIG. 7A is a flowchart of operations expanding on a classify operation of the method of FIG. 5 that uses a generalized linear model (GLM) comparison technique, according to an example embodiment.

With reference to FIG. 7A, there is a flowchart of operations 700 expanding on classify operation 510 of method 500, using the GLM technique. Operations 700 determine commonality/similarity between security rules, e.g., first and second security rules, based on comparison points, and classify the security rules based on the determined similarity. Initial assumptions include (i) the first and second security rules have been parsed in operation 510 so their respective rule parameters (also referred to as "rule components") are known and to the extent that the first and second security rules include object names or object group names, those names have been associated with or resolved to attributes, such as numerical values as described above, and (ii) the rule parameters of the first and second rule parameters have been accessed from the preprocessing results of operation 510.

At 705, the security parameters of the first and second security rules are examined to determine/define multiple comparison points to be used to compare the first and second security rules against each other. Each comparison point identifies/defines respective rule parameters of the first and second security rules that are to be compared against each other. For example: a first comparison point identifies a rule parameter from the first security rule and a corresponding rule parameter from the second security rule to be compared against each other; a second comparison point identifies another rule parameter from the first security rule and another rule from the second security rule to be compared against each other; and so on for the remainder of the comparison points. The comparison points will form a basis for determining whether the first and second security rules are sufficiently similar as to be placed together into a similar security rule classification, sufficiently identical as to be placed together into an identical security rule classification, or sufficiently unique as to be placed into a unique classification.

At 710, a respective weight or coefficient is assigned to each comparison point. In an embodiment, the assigned weights are all the same. In another embodiment, comparison points deemed more important are weighted more heavily than comparison points deemed less important such that the assigned weights vary accordingly across the comparison points. A single weight may be assigned to each comparison point. Alternatively, multiple weights, e.g., a full weight and a partial weight that is less than the full weight, may be assigned to each of at least some of the comparison points.

At 715, for each comparison point, the respective rule parameters are compared against each other to produce a corresponding comparison score indicative of a level similarity between the respective (compared) rule parameters. The comparison score may range from a possible minimum (e.g., 0) indicative of a minimum level of similarity (i.e., a mismatch) between the respective rule parameters up to a possible maximum (e.g., 1) indicative of a maximum level of similarity (i.e., an exact match) between the respective rule parameters. In some cases, the comparison score may be an intermediate comparison score that falls between the minimum and maximum comparison scores (e.g., between 0 and 1). Such an intermediate comparison score indicates partial similarity between the rule parameters, i.e., a level of similarity that is between a total mismatch and an exact match. In an embodiment, the comparison score is normalized to fall within a value of 0 to 1, inclusive.

In an example in which the respective rule parameters for a given comparison point are both numerical values (e.g., first and second IP addresses or port numbers), if the numerical values are different, the comparison will result in the minimum comparison score indicative of a mismatch. Alternatively, if the numerical values are identical, the comparison will result in the maximum comparison score indicative of an exact match.

In another example in which the respective rule parameters are each IP address ranges, if the IP ranges are identical, the comparison will result in the maximum comparison score indicative of an exact match. If the IP addresses are not exact but overlap to some extent, but not fully, i.e., have a non-zero intersection, the comparison will result in the intermediate comparison score that falls between the minimum and the maximum comparison score (e.g., between 0 and 1) and is thus indicative of a partial match. If the IP addresses do not overlap, i.e., have zero intersection, the comparison will result in the minimum comparison score indicative of a complete mismatch.

In another example in which the respective rule parameters are each object or object group names expressed as character strings, if the character strings are identical, the comparison (of the character strings) will result in the maximum comparison score indicative of an exact match. If the character strings are not identical but share common characters, the comparison will result in the intermediate score indicative of a partial match. If the character strings do not share any common characters, the comparison will result in the minimum comparison score indicative of complete mismatch. Techniques for comparing character strings are described below in connection with FIG. 7B.

At 720, each comparison score is weighted by the weight assigned to the comparison point corresponding to that comparison score, to produce a weighted comparison score for each comparison point. In a non-limiting example, each comparison score is multiplied by the corresponding assigned weight to produce the weighted comparison score. In an embodiment in which a given comparison point is assigned both a full weight and a partial weight at operation 710, the comparison score corresponding to that comparison point is weighted with the partial weight if the comparison score indicates partial similarity between the respective rule parameters, otherwise the comparison score is weighted with the full weight, i.e., the full weight is used if the comparison score indicates either a minimum level of similarity (i.e., a total mismatch) or a maximum level of similarity (i.e., an exact match).

At 725, at least some of the weighted comparison scores are combined into a total score according to a predetermined expression/equation. For example, all of the weighted comparison scores may be combined into a total score. In another example, a subset (but not all) of the weighted comparison scores may be combined into a total score. An example expression for the total score may sum together at least some of (e.g., all of or just some of) of the weighted comparison scores to produce the total score, although other expressions are possible. The total score is indicative of an overall actual level of similarity between the first and second security rules.

At an optional normalization operation 728, a normalized test score is determined using any suitable method. In an embodiment, the total score is normalized based on a possible maximum total score corresponding to the total score, to produce a normalized total score. For example, the total score may be divided by the possible maximum total score to produce the normalized total score, although other techniques may be used to normalize the total score based on the possible maximum total score.

The possible maximum total score determined at 728 is the total score that would result at operation 725 assuming the first and second security rules (and the respective rule parameters for each comparison point) were identical to each other, although the first and second security rules in reality may not be identical. The possible maximum total score indicates a maximum level of similarity (i.e., an exact match) between the first and second security rules (and their respective rule parameters). In an embodiment in which each comparison score for each comparison point is normalized to a maximum of 1 and multiplied by the corresponding assigned weight at operation 720, the possible maximum total score may be determined based solely on the assigned weights, which may be combined into the possible maximum score using the same expression that combined the weighted comparison scores into the total score. In an embodiment in which both full and partial weights are assigned to one or more of the comparison points at operation 710, only the full weights are combined into the possible maximum total score.

At 730, the total score (which may be normalized at operation 728) is compared to a non-zero similarity score threshold and a non-zero identicality score threshold that is greater than the similarity score threshold. If the compare indicates the match score is equal to or greater than the similarity score threshold but less than the identicality score threshold, the first and second (compared) security rules are deemed similar to each other and thus classified into the similar security rule classification. If the compare indicates the total score is equal to or greater than the identicality score threshold, the first and second security rules are deemed identical to each other and thus classified into the identical security rule classification. If the compare indicates the total score is below the similarity score threshold, the first and second security rules are deemed dissimilar to each other and, optionally, may be classified into a unique classification.

When a security rule (e.g., the first or second security rule) is classified into a similar or identical security rule classification, the security rule is entered into the classification along with a descriptor that identifies the file location (e.g., line number and file name) of that security rule as well as an indicator of the type of commonality, e.g., similar or identical, associated with the classification.

In an example in which operation 705 defines as the comparison points various rule parameters used in the access list—extended model, operation 725 may evaluate the following expression, in which "|match on <point of comparison>?|" defines a match/comparison performed at operation 715 that evaluates to a comparison score:

$$\text{total score} = w_1|\text{match on name?}|*w_2|\text{match on permit/deny?}|*$$

$$w_3|\text{match on protocol?}|*w_4|\text{match on source address?}|*$$

$$w_5|\text{match on destination address?}|+$$

$$[w_6|\text{match on service ports?}|+w_7|\text{match on rule context?}|].$$

The above equation for the total score is one embodiment, and other equations may be used. In the above equation for the total score, both a multiplicative combination and an additive combination of individual comparison scores are used. The multiplicative combination is used for comparison points deemed of higher importance, while the additive combination is used for comparison points deemed of lower importance. Also, weights $w_i$ may be initially set to 1, but other values may be used (as described below). In addition, the similar score threshold may be set to 20 and the identical score threshold may be set to 40, for example, so that if the total score evaluates to 20 or 30, the security rules being compared are deemed similar, and if the total score evaluates to 40 or greater, the security rules being compared are deemed identical, otherwise the security rules are deemed unique.

Further examples of weights that may be assigned to comparison points are indicated below in parenthesis following each of the comparison points.
1. Name of security rule group (5).
2. Control action (10).
3. Protocol (10).
4. Source vs. Source (Full=40, Partial=20).
5. Destination vs. Destination (Full=40, Partial=20).
6. Source vs. Destination (Full=10, Partial=5).

From the above, it is seen that the comparison points for source vs. source (e.g., source IP address vs. source IP address) and destination vs. destination (e.g., destination IP address vs. destination IP address) are deemed more important, and thus weighted more heavily, than other comparison points. Also, where multiple weights (e.g., full and partial weights) are assigned to a point of comparison, a component score indicative of an exact match will be weighted more heavily (e.g., using the full weight=40) than one indicative of a partial match (e.g., using the partial weight=20).

Figure 7B:
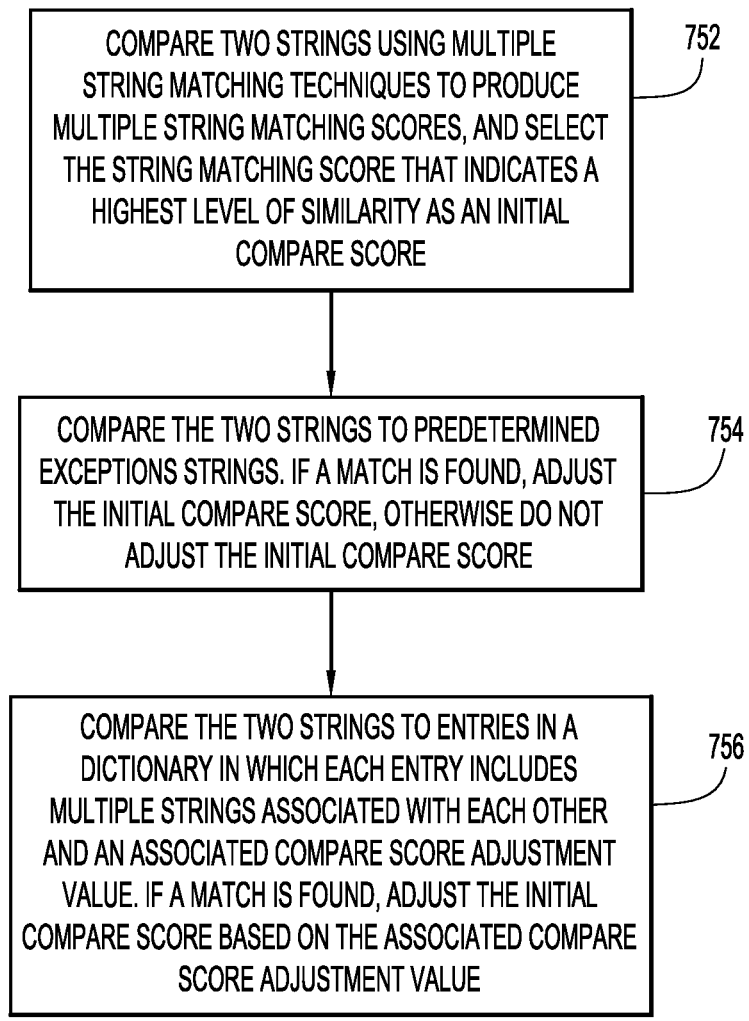
FIG. 7B is a flowchart of a method of comparing respective rule parameters expressed as alphanumerical character strings, which expands on a compare operation in the method of FIG. 7A, according to an example embodiment.

With reference to FIG. 7B, there is a flowchart of an example method 750 of comparing respective rule parameters expressed as alphanumerical character strings (e.g., first and second "strings") against each other, which expands on operation 715 of method 700.

At 752, the two strings are initially compared against each other using multiple string matching techniques or algorithms to produce multiple string matching scores, respectively, each indicative of a respective level of similarity between the two strings. The string matching score indicating a highest level of similarity between the two strings is selected as an initial comparison score.

Each string matching technique may be any known or hereafter developed technique for string matching, including, but not limited to, techniques based on the Levenshtein distance and "approximate string matching." A first technique may measure raw differentiation of the strings on a character-by-character basis, e.g., a sequential character-by-character comparison to indicate how many characters differ between the two strings. A second technique may include a white comparison which tokenizes each string (using, e.g., underscores and dashes as white space between characters in a given string) and measures how many tokens in the strings match between the two strings. For example, if one string includes "email_monitoring" and the other string includes "monitoring_email," then the white comparison will indicate a high score since both strings include the same tokens "email" and "monitoring," but the character-by-character comparison will indicate a low score when comparing the two strings.

After the two strings are initially compared against each other using the string matching techniques of 752, at 754, "exception" string processing is performed on the two strings. In exception string processing, the two strings are each compared against a predetermined list of exception (character) strings. If the compare indicates that neither string matches any of the exception strings, flow proceeds to next operation 756. On the other hand, if the compare indicates that either string matches any of the exception strings, the numerical values of the two strings (i.e., the numerical values to which the two strings were resolved during parsing of the first and second security rules at 510) are compared against each other. The initial comparison score (from 752) may be adjusted based on results of the numerical value compare. For example, if the numerical value compare indicates a mismatch between the two numerical values, the initial comparison score may be reduced, e.g., set equal to the minimum comparison score. On the other hand, if the numerical compare indicates a match, flow proceeds to next operation 756.

In an example, configuration files may use auto-generated names for objects or object groups in security rule parameters, e.g., "DM_inline xxx." Two auto-generated names may be indicated as similar (e.g., will yield a high initial comparison score) when initially compared using the sting matching techniques, but that similarity may not be meaningful from the viewpoint of intent because the names are simply machine generated. Such known auto-generated names (e.g., "DM_inline") may be stored in the predetermined list of exception strings.

After the exception string processing of 754, at 756, dictionary (character) string processing of the two strings is performed. In dictionary processing, the two strings are each compared against predetermined entries in a dictionary, in which each entry includes multiple character strings that are associated with each other. Each entry may also include a comparison score adjustment value that is associated with the character strings of that entry. If the compare to the entries of the dictionary indicates that neither of the two strings matches any dictionary entry, method 750 ends. On the other hand, if the compare to the entries of the dictionary indicates a match between either of the two strings and any string in any dictionary entry, the initial comparison score is further adjusted according to the comparison score adjustment value associated with entry in which the match is found (i.e., the matched entry). The initial score value may be increased or decreased depending on the comparison score adjustment value.

In an example, the dictionary associates together different character strings that may have essentially equivalent meanings to a user, but would not reveal similarity using the string matching techniques. For example, "email," "exchange," and "port 135" (assuming a user reserves port 135 for access to email) may be associated with each other in the dictionary to indicate "email." In another example, "HTTP" may be associated with a "port 8080," and "HTTPS" may be associated with "port 8081," "port 9443," and "port 443" in the dictionary.

Method 700 may be repeated to compare additional security rules of a configuration file against each other to populate identical, similar, and unique classifications with the compared security rules based on the total scores (which may be normalized as described above) that result from the compares.

An operation that may be used to populate the classifications based on the total scores is referred to as a stack rank operation (or "stack ranking") that lists the compared security rules in a ranked order of similarity based on the total scores. Stack ranking is now described. Compared security rules are stack ranked based on their normalized total scores obtained by the respective comparison between security rules such that security rules that are similar are close together in a stack rank, e.g., at the top of the stack rank. For example, if security rule R1 is most similar to security rule R2, then security rule R3, then security rule R4, the stack rank would be R1, R2, R3, and R4. The security rules are stack ranked based on the normalized total score for the two security rules that are compared. For example, security rule R1 when compared against security rule R2 yields a (normalized) total score of 20, security rule R1 when compared against security rule R2 yields a total score of 15, security rule R1 when compared against security rule R3 yields a total score of 10, and so on to establish the stack rank R1, R2, R3, and so on.

In an example, stack ranking starts with a first security rule configuration file (file 1). Initially, all of the security rules in file 1 are compared against each other to establish the stack rank list of security rules in terms of comparisons/matching for that file. The stack rack results from comparing every security rule in the file to every other security rule in the file. The total scores are matched (compared) against identical, similar, and unique classification thresholds to classify various ones of the security rules as identical, similar, or different. The group of security rules at the top of the stack rank will likely be identical, those lower down as similar, and those still lower down as unique. In an example, R1, R2, and R3 are compared to yield total scores above a threshold indicative of identity and are classified as identical. However, the total scores for R3 against R4, R5 are below the threshold indicative of identity but above the threshold indicative of uniqueness, i.e., in the range of similar, so R4, R5 are classified as similar. Below that, security rules are classified as unique.

For subsequent files, the security rules therein are compared against the classified security rules resulting from the comparisons of the security rules in file 1 against themselves.

Consider the following example. A first security rule arrives (is input to the comparison and classify logic). The first security rule is classified as unique because it is alone. A second security rule arrives. Perform a pair wise comparison of the first and second security rules security rule component-by-rule components as described above to produce a total score that is above a similarity threshold of 0.65 normalized, but not above an identical threshold. First and second security rules are joined into the similar group. A third security rule arrives and compares poorly against the first security rule, so is classified as unique. This process continues to populate the classification as the security rules arrive. In a simple example, if the comparison R1 vs. R2 scores above a similarity threshold, then R1 and R2 join the similar classification. If the comparison of R1 vs. R3 also scores above the similarity threshold, R3 joins the similar classification.

Figure 8:
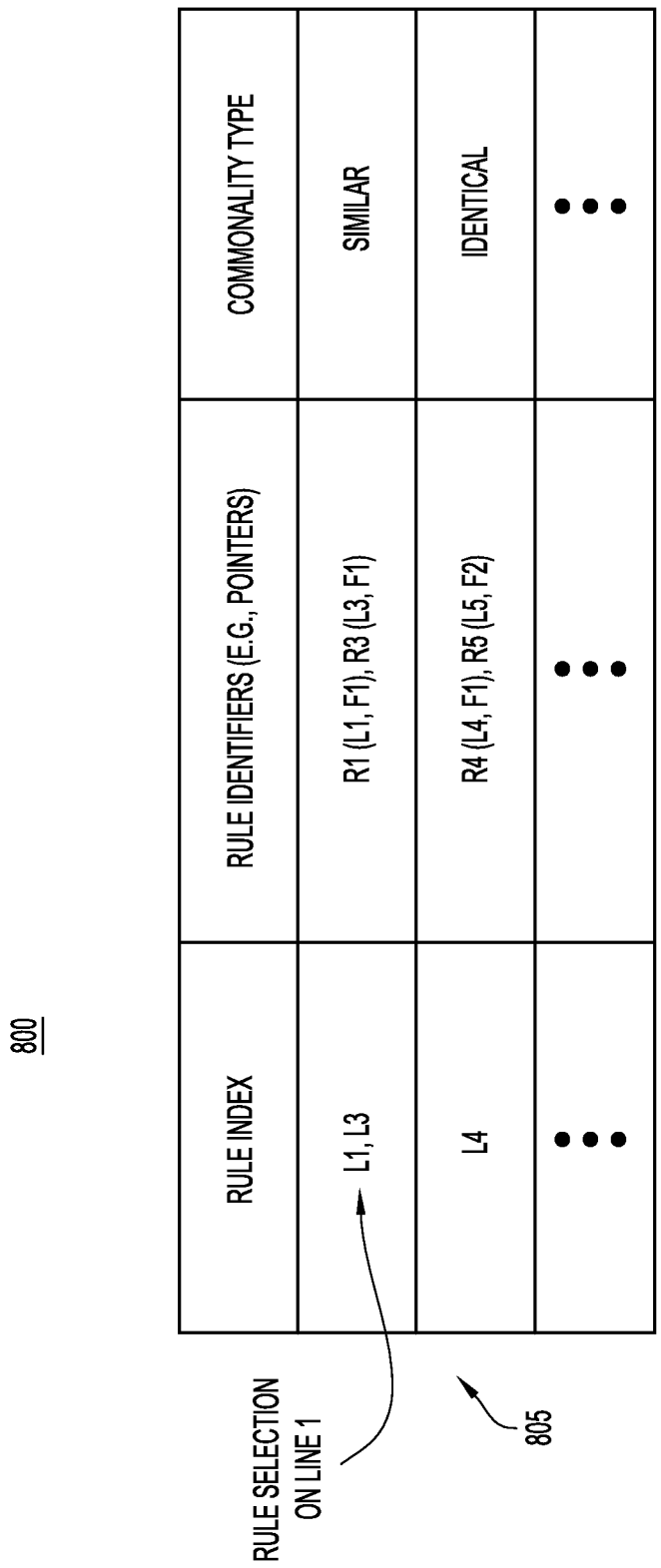
FIG. 8 is an illustration of an example security rule classification database generated by the method of FIG. 7A, according to an example embodiment.

With reference to FIG. 8, there is an illustration of an example security rule classification database 800 generated by method 700. In the example of FIG. 8, database 800 is represented as a table having rows 805 each to represent a respective security rule classification into which multiple security rules have been classified. The columns include: a rule index that lists file locations, such as line numbers L1, L2, and so on, that are an index or key to the security rules in the security rule classification for the given row; security rule identifiers including the location (e.g., line number Li and filename Fi) of each security rule Ri in the security rule classification for the given row; and a commonality type for the security rule classification for the given row (e.g., "similar" or "identical"). The security rule identifiers, e.g., line number Li and filename Fi, may include address pointers to a given line number Li in a given named file Fi for a given security rule Ri. In the example of FIG. 8, row 1 represents a similar security rule classification into which similar security rules R1 (located at line L1 in filename F1) and R2 (located at line L2 in filename F1) are classified. Row 2 represents an identical security rule classification into which identical security rules R4 (located at line L4 in filename F1) and R5 (located at line L2 in filename F2) are classified. The information in database 800 may be organized in many different ways, such as in one or more linked lists of classification nodes that each store rule locations and indicators of commonality type.

Security rule classification database 800 may be used in the following manner. At operation 550 described above, the IDE receives a user selection of a security rule through the editor. The IDE uses the line number of the selected rule (available from the editor) as an index to search the rule indexes of classification database 800 for a match. If a match is found, the IDE accesses the rule identifiers and the commonality type in the row (i.e., security rule classification) of database 800 corresponding to the match. The IDE uses the rule identifiers to locate and access the other security rules, from their respective files and line numbers within those files, that are in the same classification as the selected rule and generates for display the other security rules, their locations, and the commonality type. For example, if the selected rule is on line 1 of the file with filename F1, the IDE uses line L1 as the index to find the similar security classification corresponding to row 1 of database 800, and to access information for the other security rule R3 in that classification.

Figure 9:
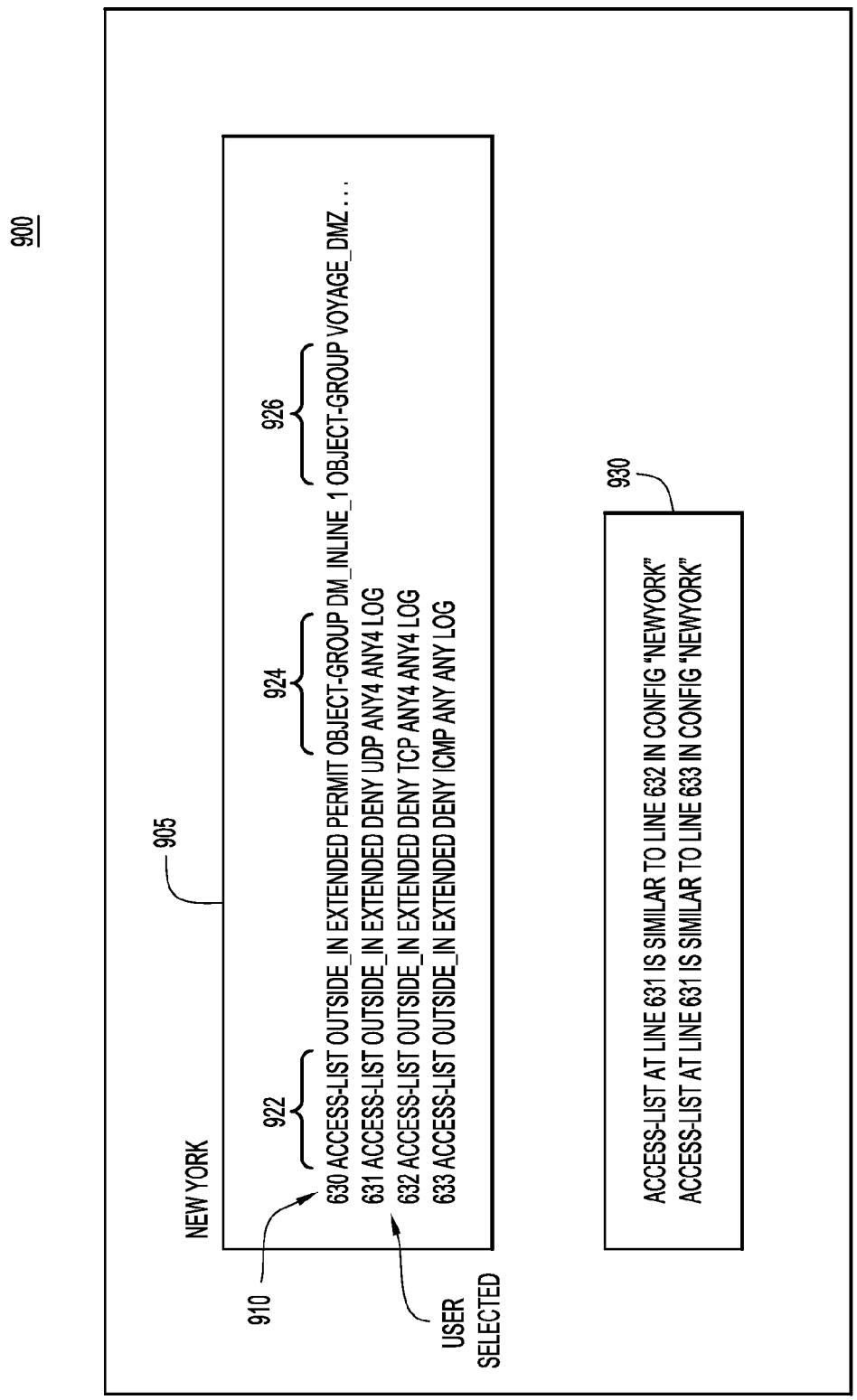
FIG. 9 is an illustration of an example User Interface (UI) displayed by an editor in connection with the IDE and that shows a part of an opened configuration file, according to an example embodiment.

With reference to FIG. 9, there is an illustration of an example User Interface (UI) 900 displayed by an editor responsive to information generated for display in connection with the IDE and that shows a part of an opened configuration file (i.e., "config") named "NEWYORK" in an edit window 905. Edit window 905 shows line numbers 910 for each line of the configuration file. Each line represents a corresponding security rule. In the example of FIG. 9, the security rule parameters include, but are not limited to, a security rule indicator 922 (e.g., access list), an object group designator 924 (e.g., "object-group"), and an object group designator 926. These security rule parameters are all regular expressions found in the regular expression search of operation 535 and are, therefore, highlighted for ease of recognition by the viewer. In line 630, "DM_INLINE_1" and "Voyage_DMZ" are object group names having attributes defined in the object definitions of config NEWYORK (not specifically shown in FIG. 9).

In the example of FIG. 9, the user has selected the security rule on line 631, e.g., by clicking on line number 631. In response, the IDE has searched classifications database 800 linked by the IDE to configuration file NEWYORK and found that the security rule at line 631 belongs to a similar security rule classification indicating similar security rules at lines 632 and 633 of config NEWYORK. Thus, UI 900 also includes a classification window 930 (containing information generated by the IDE and displayed by the IDE) to indicate that the security rules at lines 632 and 633 are similar to the selected security rule at line 631.

Figure 10:
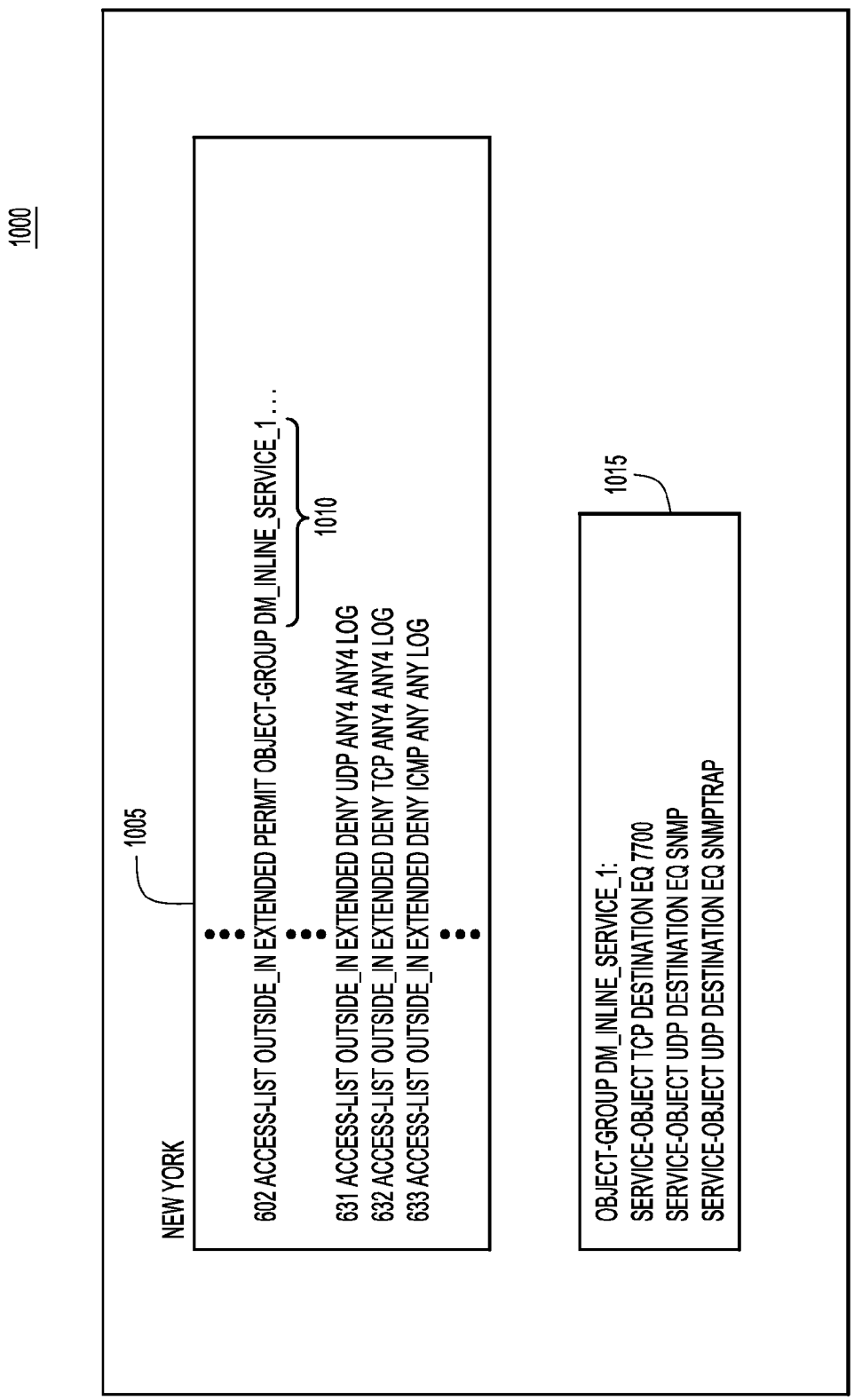
FIG. 10 is an illustration of another example UI displayed by the editor in connection with the IDE, according to an example embodiment.

With reference to FIG. 10, there is an illustration of another example User Interface (UI) 1000 displayed by the editor in connection with the IDE and that shows a part of opened configuration file NEWYORK in an edit window 1005. In the example of FIG. 10, the user has selected object-group name 1010 "DM_INLINE_SERVICE_1." In response to the user selection, the IDE has accessed the attributes linked to object-group name 1010 in the mapping database 615. Thus UI 1000 also includes an attributes window 1015 generated by the IDE that indicates the attributes mapped to the selected object-group.

Figure 11:
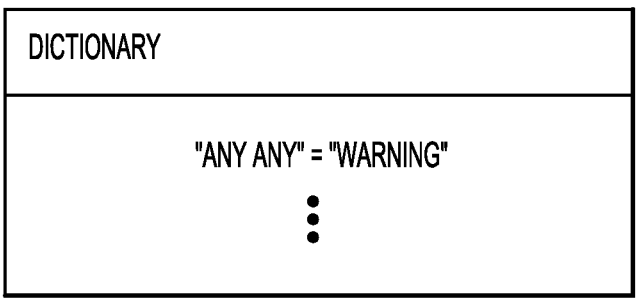
FIG. 11 is an illustration of an example dictionary defining prohibited or potentially dangerous parameters, which may be used with the method of FIG. 5, according to an example embodiment.

With reference to FIG. 11, there is an illustration of an example dictionary that defines prohibited or potentially dangerous parameters that may be used in operation 540. In the example of FIG. 11, dictionary 1100 defines/stores a security parameter "any any" and a corresponding warning "warning" to be displayed via a UI should the stored security parameter be found in one of the security rules of a configuration file in operation 540.

Figure 12:
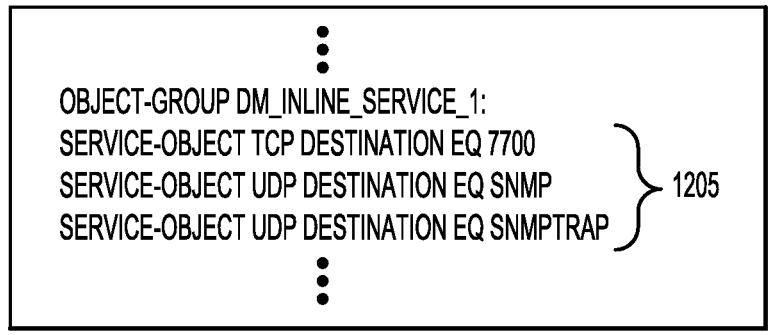
FIG. 12 is an illustration of an entry in a mapping database created by a security rule parser and used in the method of FIG. 5, according to an example embodiment.

FIG. 12 is an illustration of an example entry 1200 in mapping database 615 created and used in the method of FIG. 5, according to an example embodiment. The entry maps the object group name "DM_INLINE_SERVICE_1" to its various attributes 1205 as defined in the corresponding object definitions of the configuration file. The attributes are displayed in connection with selected object group name "DM_INLINE_SERVICE_1" in the UI 1000 of FIG. 10.

Returning to weighting operation 720, in one embodiment, the weighting assigned to the compare score for each point of comparison may be static, i.e., predetermined weights may be used to weight the compare scores. In another embodiment, the weights may not be static, and may be tuned based on feedback on how well the classification of security rules is deemed to be doing. For example, a user may examine security rules classified as similar and provide feedback that the security rules are not similar, or examine security rules classified as unique and provide feedback that the security rules are similar. Such feedback may be used to retune the weights to reorganize the classification of the security rules to align with the user feedback. Machine learning techniques may train off of or learn from user feedback to retune/reset the weights to reorganize the classification of the security rules. For example, the feedback may be used to retune the weights to minimize a classification of similarity between security rules that the user feedback indicated were unique and maximize a classification of similarity between security rules the user feedback indicated were similar. There are two distinct axes across which the machine learning may be applied. The first is the use of global weighting that is the same across all users/ configuration files. The second is the use of user specific weighting. Different users may like using certain group names, so individualized weighting gives more weight to the dictionaries.

In summary, in one form, a method is provided comprising: accessing a first security rule and a second security rule from a configuration file stored in a memory, each of the first and second security rules including multiple rule parameters to cause a security appliance to apply an access control when a source attempts to access a destination; determining comparison points for comparing the first and the second security rules, each comparison point identifying respective rule parameters of the first and the second security rules; assigning respective weights to the comparison points; comparing, for each comparison point, the respective rule parameters against each other to produce a corresponding comparison score indicative of a level of similarity; weighting each comparison score by a weight assigned to the comparison point corresponding to the comparison score; combining the weighted comparison scores into a total score indicative of an overall level of similarity between the first and the second security rules; and classifying the first and the second security rules as identical or similar based on the total score.

In another form, an apparatus is provided comprising: a network interface unit configured to communicate with a network; and a processor coupled to the network interface unit and configured to: access a first security rule and a second security rule from a configuration file stored in a memory, each of the first and the second security rules including multiple rule parameters to cause a security appliance to apply an access control when a source attempts to access a destination; determine comparison points for comparing the first and the second security rules, each comparison point identifying respective rule parameters of the first and the second security rules; assign respective weights to the comparison points; compare, for each comparison point, the respective rule parameters against each other to produce a corresponding comparison score indicative of a level of similarity; weight each comparison score by a weight assigned to the comparison point corresponding to the comparison score; combine the weighted comparison scores into a total score indicative of an overall level of similarity between the first and the second security rules; and classify the first and the second security rules as identical or similar based on the total score.

In yet another form, a non-transitory tangible computer readable storage media encoded with instructions is provided. The instructions, when executed by a processor, cause the processor to access a first security rule and a second security rule from a configuration file stored in a memory, each of the first and second security rules including multiple rule parameters to cause a security appliance to apply an access control when a source attempts to access a destination; determine comparison points for comparing the first and the second security rules, each comparison point identifying respective rule parameters of the first and the second security rules; assign respective weights to the comparison points; compare, for each comparison point, the respective rule parameters against each other to produce a corresponding comparison score indicative of a level of similarity; weight each comparison score by a weight assigned to the comparison point corresponding to the comparison score; combine the weighted comparison scores into a total score indicative of an overall level of similarity between the first and the second security rules; and classify the first and the second security rules as identical or similar based on the total score.

The above description is intended by way of example only. Various modifications and structural changes may be made therein without departing from the scope of the concepts described herein and within the scope and range of equivalents of the claims.

What is claimed is:

1. A computer implemented method comprising:
accessing a first security rule and a second security rule from a configuration file stored in a memory, each of the first and the second security rules including multiple rule parameters to cause a security appliance to apply an access control when a source attempts to access a destination, wherein the first and the second security rules each include one or more source Internet Protocol (IP) addresses to represent the source, one or more destination IP addresses to represent the destination, and a permit access control or deny access control to represent the access control;
determining comparison points for comparing the first and the second security rules, each comparison point identifying respective rule parameters of the first and the second security rules, the comparison points including a first comparison point identifying the one or more source IP addresses of each of the first and second security rules, a second comparison point identifying the one or more destination IP addresses of the first and the second security rules, and a third comparison point identifying the permit access control or deny access control of each of the first and the second security rules;
assigning respective weights to the comparison points;
comparing, for each comparison point, the respective rule parameters against each other to produce a corresponding comparison score indicative of a level of similarity;
weighting each comparison score by a weight assigned to the comparison point corresponding to the comparison score;
combining the weighted comparison scores into a total score indicative of an overall level of similarity between the first and the second security rules; and
classifying the first and the second security rules as identical or similar to each other based on the total score.

2. The method of claim 1, wherein the determining comparison points further includes determining a fourth comparison point identifying as further respective rules the one or more source IP addresses of the first rule and the one or more destination IP addresses of the second rule.

3. The method of claim 1, wherein the assigning includes assigning higher weights to the first and the second comparison points than to the third comparison point.

4. The method of claim 1, wherein the assigning includes assigning the respective weights to vary across the comparison points.

5. The method of claim 1, wherein:
the respective rule parameters corresponding to a given one of the comparison points are expressed as respective character strings;
the comparing includes comparing the respective character strings against each other using different string matching algorithms that produce respective string matching scores each indicative of a respective level of similarity between the compared character strings; and
the method further comprises selecting a preferred one of the string matching scores as the comparison score for the given one of the comparison points.

6. The method of claim 5, further comprising:
comparing each of the respective character strings to a predetermined list of exception character strings;
comparing each of the respective character strings to entries of a predetermined dictionary, each entry in the dictionary including multiple character strings associated with each other; and
adjusting the comparison score for the given one of the comparison points based on results of the comparing to the predetermined list of exception character strings and results of the comparing to the entries of the predetermined dictionary.

7. The method of claim 5, further comprising:
comparing each of the respective character strings to a predetermined list of exception character strings; and
if the comparing to the predetermined list of exception character strings indicates a match between either of the respective character strings and any of the exception character strings:
resolving each of the respective characters strings to a corresponding numeric value defined in the configuration file;
comparing the numeric values to each other; and
adjusting the comparison score corresponding to the given one of the comparison points based on results of the comparing the numeric values.

8. The method of claim 7, further comprising:
comparing each of the respective character strings to entries of a predetermined dictionary, each entry in the dictionary including multiple character strings associated with each other; and
if the comparing to the entries of the dictionary indicates a match between either of the respective character strings and any of the dictionary entries, further adjusting the comparison score for the given one of the comparison points.

9. The method of claim 1, further comprising:
determining a possible maximum total score indicative of a maximum level of similarity between the first and the second security rules based on an assumption that the respective rule parameters for each of the comparisons points are identical; and
normalizing the total score based on the possible maximum total score.

10. The method of claim 1, wherein:
the assigning respective weights to the comparison points includes assigning a full weight and a partial weight that is less than the full weight to one of the comparison points; and
the weighting includes weighting the comparison score corresponding to the one of the comparison points with (i) the full weight if that comparison score is a maximum comparison score indicative of an exact match between the respective rule parameters, or (ii) the partial weight if that comparison score indicates a partial match but not an exact match between the respective rule parameters.

11. An apparatus comprising:
a network interface unit configured to communicate with a network; and
a processor coupled to the network interface unit and configured to:
access a first security rule and a second security rule from a configuration file stored in a memory, each of the first and the second security rules including multiple rule parameters to cause a security appliance to apply an access control when a source attempts to access a destination, wherein the first and the second security rules each include one or more source Internet Protocol (IP) addresses to represent the source, one or more destination IP addresses to represent the destination, and a permit access control or deny access control to represent the access control;
determine comparison points for comparing the first and the second security rules, each comparison point identifying respective rule parameters of the first and the second security rules, the comparison points including a first comparison point identifying the one or more source IP addresses of each of the first and second security rules, a second comparison point identifying the one or more destination IP addresses of the first and the second security rules, and a third comparison point identifying the permit access control or deny access control of each of the first and the second security rules;
assign respective weights to the comparison points;
compare, for each comparison point, the respective rule parameters against each other to produce a corresponding comparison score indicative of a level of similarity;
weight each comparison score by a weight assigned to the comparison point corresponding to the comparison score;
combine the weighted comparison scores into a total score indicative of an overall level of similarity between the first and the second security rules; and
classify the first and the second security rules as identical or similar to each other based on the total score.

12. The apparatus of claim 11, wherein the processor is configured to assign by assigning higher weights to the first and the second comparison points than to the third comparison point.

13. The apparatus of claim 11, wherein:
the respective rule parameters corresponding to a given one of the comparison points are expressed as respective character strings;
the processor is configured to compare by comparing the respective character strings against each other using different string matching algorithms that produce respective string matching scores each indicative of a respective level of similarity between the compared character strings; and
the processor is further configured to select a preferred one of the string matching scores as the comparison score for the given one of the comparison points.

14. The apparatus of claim 11, wherein:
the processor is configured to assign by assigning a full weight and a partial weight that is less than the full weight to one of the comparison points; and
the processor is configured to weight by weighting the comparison score corresponding to the one of the comparison points with (i) the full weight if that comparison score is a maximum comparison score indicative of an exact match between the respective rule parameters, or (ii) the partial weight if that comparison score indicates a partial match but not an exact match between the respective rule parameters.

15. A non-transitory computer readable storage media encoded with instructions that, when executed by a processor, cause the processor to:
access a first security rule and a second security rule from a configuration file stored in a memory, each of the first and the second security rules including multiple rule parameters to cause a security appliance to apply an access control when a source attempts to access a destination, wherein the first and the second security rules each include one or more source Internet Protocol (IP) addresses to represent the source, one or more destination IP addresses to represent the destination, and a permit access control or deny access control to represent the access control;

determine comparison points for comparing the first and the second security rules, each comparison point identifying respective rule parameters of the first and the second security rules, the comparison points including a first comparison point identifying the one or more source IP addresses of each of the first and second security rules, a second comparison point identifying the one or more destination IP addresses of the first and the second security rules, and a third comparison point identifying the permit access control or deny access control of each of the first and the second security rules;

assign respective weights to the comparison points;

compare, for each comparison point, the respective rule parameters against each other to produce a corresponding comparison score indicative of a level of similarity;

weight each comparison score by a weight assigned to the comparison point corresponding to the comparison score;

combine the weighted comparison scores into a total score indicative of an overall level of similarity between the first and the second security rules; and classify the first and the second security rules as identical or similar to each other based on the total score.

16. The computer readable storage media of claim 15, wherein the instructions to cause the processor to assign include instructions to cause the processor to assign higher weights to the first and the second comparison points than to the third comparison point.

17. The computer readable storage media of claim 15, wherein:

the respective rule parameters corresponding to a given one of the comparison points are expressed as respective character strings;

the instruction to cause the processor to compare include instructions to cause the processor to compare the respective character strings against each other using different string matching algorithms that produce respective string matching scores each indicative of a respective level of similarity between the compared character strings; and the computer readable storage media further comprises instructions to cause the processor to select a preferred one of the string matching scores as the comparison score for the given one of the comparison points.

* * * * *